(12) United States Patent
Chang

(10) Patent No.: US 12,296,851 B2
(45) Date of Patent: May 13, 2025

(54) AUTONOMOUS VEHICLE COMMUNICATION SAFETY SYSTEM AND METHOD THEREOF

(71) Applicant: AUTOMOTIVE RESEARCH & TESTING CENTER, Changhua Hsien (TW)

(72) Inventor: Wei-Xuan Chang, Changhua Hsien (TW)

(73) Assignee: AUTOMOTIVE RESEARCH & TESTING CENTER, Changhua Hsien (TW)

( * ) Notice: Subject to any disclaimer, the term of this patent is extended or adjusted under 35 U.S.C. 154(b) by 405 days.

(21) Appl. No.: 18/085,268

(22) Filed: Dec. 20, 2022

(65) Prior Publication Data
US 2024/0199078 A1    Jun. 20, 2024

(51) Int. Cl.
*H04W 12/041* (2021.01)
*B60W 60/00* (2020.01)
*H04W 4/40* (2018.01)
*H04W 12/03* (2021.01)

(52) U.S. Cl.
CPC ......... *B60W 60/0015* (2020.02); *H04W 4/40* (2018.02); *H04W 12/03* (2021.01); *H04W 12/041* (2021.01)

(58) Field of Classification Search
None
See application file for complete search history.

(56) References Cited

U.S. PATENT DOCUMENTS

| | | | |
|---|---|---|---|
| 2015/0052352 A1* | 2/2015 | Dolev | H04L 9/3278 713/156 |
| 2015/0156013 A1* | 6/2015 | Zhao | H04L 63/08 380/270 |
| 2017/0142078 A1* | 5/2017 | Lee | H04L 63/06 |
| 2020/0029209 A1* | 1/2020 | Nölscher | H04W 12/069 |
| 2023/0294635 A1* | 9/2023 | Saito | B60R 25/01 340/5.61 |

FOREIGN PATENT DOCUMENTS

WO    WO-2012177812 A1 * 12/2012 ............. H04L 63/08

* cited by examiner

*Primary Examiner* — Anh Vu H Ly
(74) *Attorney, Agent, or Firm* — RABIN & BERDO, P.C.

(57) ABSTRACT

An autonomous vehicle communication safety system includes a vehicle-mounted communication device and a terminal communication device. At least two communication channels are established between the vehicle-mounted communication device and the terminal communication device. At least one vehicle-mounted processor of the vehicle-mounted communication device generates a key, stores the key in a data packet, encrypts and compresses the data packet, and outputs the data packet which has been encrypted and compressed through the at least two communication channels to at least one terminal processor of the terminal communication device. Once received, at least two encrypted and compressed data packets are decompressed and decrypted by the at least one terminal processor to obtain at least two keys to be verified. The least one terminal processor determines whether the keys to be verified are identical and consequently controls connection statuses of the at least two communication channels.

20 Claims, 7 Drawing Sheets

AUTONOMOUS VEHICLE COMMUNICATION SAFETY SYSTEM AND METHOD THEREOF

BACKGROUND OF THE INVENTION

1. Field of the Invention

The present invention relates to a communication safety system and a communication method thereof, more particularly an autonomous vehicle communication safety system and method thereof.

2. Description of the Related Art

An autonomous vehicle is able to wirelessly connect to a road side unit (RSU), a back-end information station, or another autonomous vehicle for wireless communications. As such, the autonomous vehicle not only is able to share its information (such as satellite navigation coordinates, acceleration information, live camera feed, traffic information, and speed, etc.) to the RSU, the back-end information station, or said another autonomous vehicle, but also is able to receive information conversely from the RSU, the back-end information station, or said another autonomous vehicle. Based on these information, the autonomous vehicle would autonomously execute various controls for controlling the vehicle. The various controls, for example, include a vehicle speed control (of maintaining speed, accelerating, decelerating, or braking), a route control (of heading straight, turning, cutting off, or pulling over), and a formation control of changing vehicle formation in relations to other surrounding vehicles.

As described above, wireless communication is a very important aspect for autonomous vehicles, and securing integrity of wireless communication for autonomous vehicles is also an aspect equally as important. For example, if the wireless communication between the autonomous vehicle and another device is compromised by a hacker, information communicated between the autonomous vehicle and the other device might be altered, resulting in the autonomous vehicle executing erroneous controls based on false information. On the other hand, the other device communicating with the autonomous vehicle would also receive false information and ineffectively comprehend a driving status of the autonomous vehicle.

SUMMARY OF THE INVENTION

The present invention provides an autonomous vehicle communication safety system and a method thereof. By cross-verifying multiple communication channels, communication between an autonomous vehicle and another device is made more secured.

The autonomous vehicle communication safety system includes:
  a vehicle-mounted communication device, mounted on an autonomous vehicle, and having at least one vehicle-mounted processor and multiple vehicle-mounted communication interfaces; wherein the vehicle-mounted communication interfaces are electrically connected to the at least one vehicle-mounted processor; wherein the at least one vehicle-mounted processor generates a key according to at least one host vehicle information of the autonomous vehicle, and the at least one vehicle-mounted processor stores the key within a data packet; and
  a terminal communication device, mounted away from the vehicle-mounted communication device, and having at least one terminal processor and multiple terminal communication interfaces; wherein the terminal communication interfaces are electrically connected to the at least one terminal processor; wherein at least two communication channels are established between at least two of the terminal communication interfaces and at least two of the vehicle-mounted communication interfaces;
  wherein the at least one vehicle-mounted processor encrypts and compresses the data packet and outputs the data packet which has been encrypted and compressed through the at least two communication channels; the at least one terminal processor receives at least two encrypted and compressed data packets through the at least two communication channels, and after decompressing and decrypting the at least two encrypted and compressed data packets, the at least one terminal processor receives at least two keys to be verified; the at least one terminal processor determines whether the at least two keys to be verified are identical, and then accordingly controls connection statuses of the at least two communication channels.

The autonomous vehicle communication safety method is executed by a vehicle-mounted communication device and a terminal communication device. At least two communication channels are established between the vehicle-mounted communication device and the terminal communication device. The autonomous vehicle communication safety method includes the following steps:
  generating a key according to at least one host vehicle information of the autonomous vehicle by at least one vehicle-mounted processor of the vehicle-mounted communication device;
  storing the key within a data packet, encrypting and compressing the data packet, and outputting the data packet which has been encrypted and compressed through the at least two communication channels by the at least one vehicle-mounted processor;
  receiving at least two encrypted and compressed data packets through the at least two communication channels by at least one terminal processor of the terminal communication device;
  receiving at least two keys to be verified by decompressing and decrypting the at least two encrypted and compressed data packets by the at least one terminal processor; and
  determining whether the at least two keys to be verified are identical, and then accordingly controlling connection statuses of the at least two communication channels by the at least one terminal processor.

The at least one vehicle-mounted processor of the present invention stores the unique key in the data packet, and according to a collaboration between the vehicle-mounted communication device and the terminal communication device, the data packet is encrypted, compressed, transported through the at least two communication channels, decompressed, and decrypted. Once decrypted, the at least one terminal processor receives the at least two keys to be verified respectively corresponding to the at least two communication channels.

The at least one terminal processor of the present invention then determines whether the at least two keys to be verified are identical, and thus cross-verifying multiple communication channels. When the at least one terminal processor determines the at least two keys to be verified are identical, the at least one terminal processor determines that multiple communication channels between the vehicle-mounted communication device and the terminal communication device are secure, and thus connection statuses of the said communication channels should remain unchanged. Vice versa, when the at least one terminal processor determines the at least two keys to be verified are different, the at least one terminal processor determines that multiple communication channels between the vehicle-mounted communication device and the terminal communication device are insecure and prone to be compromised by hackers. As such, the present invention would immediately change connection statuses of the said communication channels, and thus avoid further communicating under insecure channels and ensure communication safety for the vehicle-mounted communication device and the terminal communication device.

DETAILED DESCRIPTION OF THE INVENTION

Conventionally, an autonomous vehicle is able to wirelessly connect to a terminal via wireless communication means. The terminal may be a road side unit (RSU) or a back-end information station. In a case wherein multiple autonomous vehicles form a convoy, the terminal may also be another autonomous vehicle from the convoy. By receiving information data from the terminal, the autonomous vehicle is able to autonomously execute various controls for controlling the autonomous vehicle. The various controls, for example, include a vehicle speed control (of maintaining speed, accelerating, decelerating, or braking), a route control (of heading straight, turning, cutting off, or pulling over), and a formation control of changing vehicle formation in relations to other surrounding vehicles. The various controls are free to include other forms of control schemes.

Figure 1:
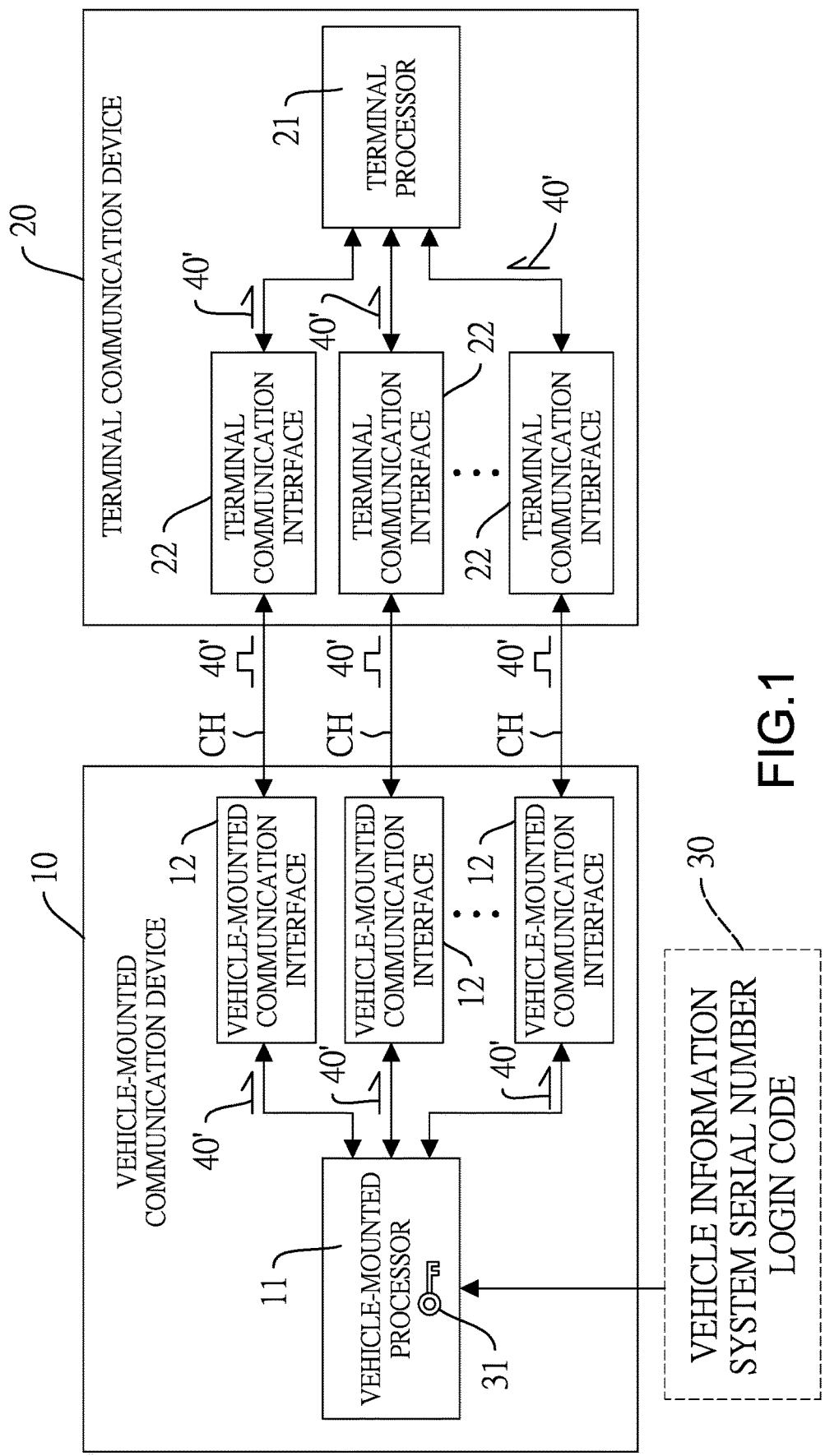
FIG. 1 is a block diagram of an autonomous vehicle communication safety system of the present invention.

With reference to FIG. 1, an autonomous vehicle communication safety system of the present invention includes a vehicle-mounted communication device 10 and a terminal communication device 20. The vehicle-mounted communication device 10 is mounted on an autonomous vehicle provided to the present invention. In an embodiment, the autonomous vehicle includes Global Positioning System (GPS) positioning capabilities, inertial measurement capabilities, and camera feed recording capabilities when driving, etc. In an embodiment, the autonomous vehicle is one of the vehicles of a convoy, and in another embodiment, the autonomous vehicle is driving independently from the convoy. The terminal communication device 20 is mounted on a terminal away from the vehicle-mounted communication device 10. As previously mentioned, the terminal may be another autonomous vehicle, the RSU, or the back-end information station.

The vehicle-mounted communication device 10 includes at least one vehicle-mounted processor 11 and multiple vehicle-mounted communication interfaces 12, and the vehicle-mounted communication interfaces 12 are electrically connected to the at least one vehicle-mounted processor 11. In other words, the vehicle-mounted communication device 10 may include one or more of the at least one vehicle-mounted processor 11 for applications of distributed network managing. For ease of explanations, the present embodiment of the present invention uses one single said vehicle-mounted processor 11 as an example. The vehicle-mounted processor 11 is a processor chip, and the vehicle-mounted processor 11 is able to receive a vehicle information of the autonomous vehicle through an On-Board Diagnostics (OBD-II) and/or a Controller Area Network Bus (CAN Bus). The vehicle information includes at least one of the following: an identification (ID), a vehicle identification number (VIN), a system time of an autonomous operating system of the autonomous vehicle, vehicle coordinates (such as GPS coordinates), acceleration information (such as throttle openness signal, speed control signal, and/or brake signal), live camera feed, traffic information, and speed, etc. On the other hand, the vehicle-mounted processor 11 also receives a system serial number and a login code from the autonomous operating system of the autonomous vehicle. The login code represents a user identity conveyed and stored by a digital key or a digital controller that started the autonomous vehicle. The vehicle-mounted communication interfaces 12 are wireless communication interfaces, and the vehicle-mounted communication interfaces 12 further include a mobile communication interface and a short-range wireless communication interface. Each of the vehicle-mounted communication interfaces 12 has a different wireless communication interface type, for example, each of the vehicle-mounted communication interfaces 12 uses different communication protocols.

The terminal communication device 20 includes at least one terminal processor 21 and multiple terminal communication interfaces 22, and the terminal communication interfaces 22 are electrically connected to the at least one terminal processor 21. In other words, the terminal communication device may include one or more of the at least one terminal processor 21 for applications of distributed network managing. For ease of explanations, the present embodiment of the present invention uses one single said terminal processor 21 as an example. The terminal processor 21 is a processor chip, and the terminal communication interfaces 22 are wireless communication interfaces. In an embodiment, at least two wireless communication interface types of the terminal communication interfaces 22 correspond to at least two wireless communication interface types of the vehicle-mounted communication interfaces 12. In another embodiment, wireless communication interface types of the terminal communication interfaces 22 completely correspond to wireless communication interface types of the vehicle-mounted communication interfaces 12.

For example, in an embodiment, the vehicle-mounted communication interfaces 12 and the terminal communication interfaces 22 respectively include two of the following: a $5^{th}$ generation (5G) mobile communication interface, a $4^{th}$ generation (4G) mobile communication interface, a Cellular Vehicle-to-Everything (C-V2X) communication interface, a wireless fidelity (Wi-Fi) communication interface, a Bluetooth Low Energy (BLE) communication interface, and a next generation communication interface. In other embodiment, the vehicle-mounted communication interfaces 12 and the terminal communication interfaces 22 of the present invention include other types of communication interfaces.

Figure 2:
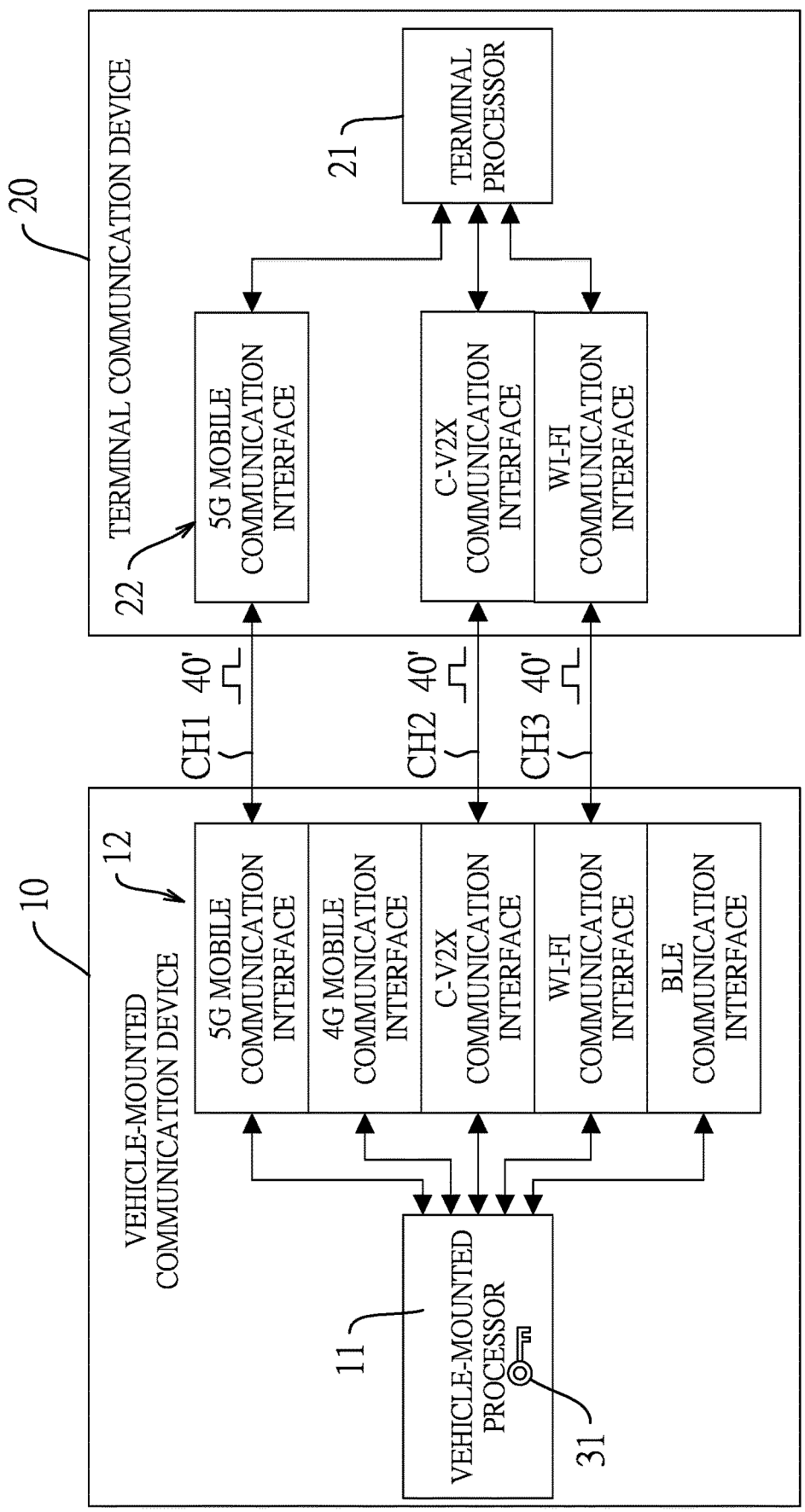
FIG. 2 is a block diagram of the autonomous vehicle communication safety system of an embodiment of the present invention.

With reference to FIG. 2, in this example, the vehicle-mounted communication interfaces 12 include the 5G mobile communication interface, the 4G mobile communication interface, the C-V2X communication interface, the Wi-Fi communication interface, and the BLE communication interface. The terminal communication interfaces 22 include the 5G mobile communication interface, the C-V2X communication interface, and the Wi-Fi communication interface.

When the vehicle-mounted communication device 10 mounted on the autonomous vehicle and the terminal communication device 20 mounted on the terminal enter each other's communication spheres, the vehicle-mounted communication device 10 and the terminal communication device 20 are able to initiate a handshake. After the handshake, the terminal communication interfaces 22 connect to the vehicle-mounted communication interfaces 12 for bi-directional data transfers. The following explanation presents an embodiment of having safe communications between the vehicle-mounted communication device 10 and the terminal communication device 20.

As previously mentioned, at least two wireless communication interface types of the terminal communication interfaces 22 correspond to at least two wireless communication interface types of the vehicle-mounted communication interfaces 12. As such, at least two communication channels CH are established between at least two of the terminal communication interfaces 22 and at least two of the vehicle-mounted communication interfaces 12. This allows the vehicle-mounted processor 11 and the terminal processor 21 to exchange data packets through the at least two communication channels CH. For instance, as the example previously described, the at least two communication channels CH include two of the following: a 5G communication channel, a 4G communication channel, a C-V2X communication channel, a Wi-Fi communication channel, a BLE communication channel, and a next generation communication channel. With reference to FIG. 2, the at least two communication channels between the vehicle-mounted communication device 10 and the terminal communication device 20 include a 5G communication channel CH1, a C-V2X communication channel CH2, and a Wi-Fi communication channel CH3. As such, the vehicle-mounted processor 11 and the terminal processor 21 exchange data packets simultaneously through the 5G communication channel CH1, the C-V2X communication channel CH2, and the Wi-Fi communication channel CH3.

Figure 3:
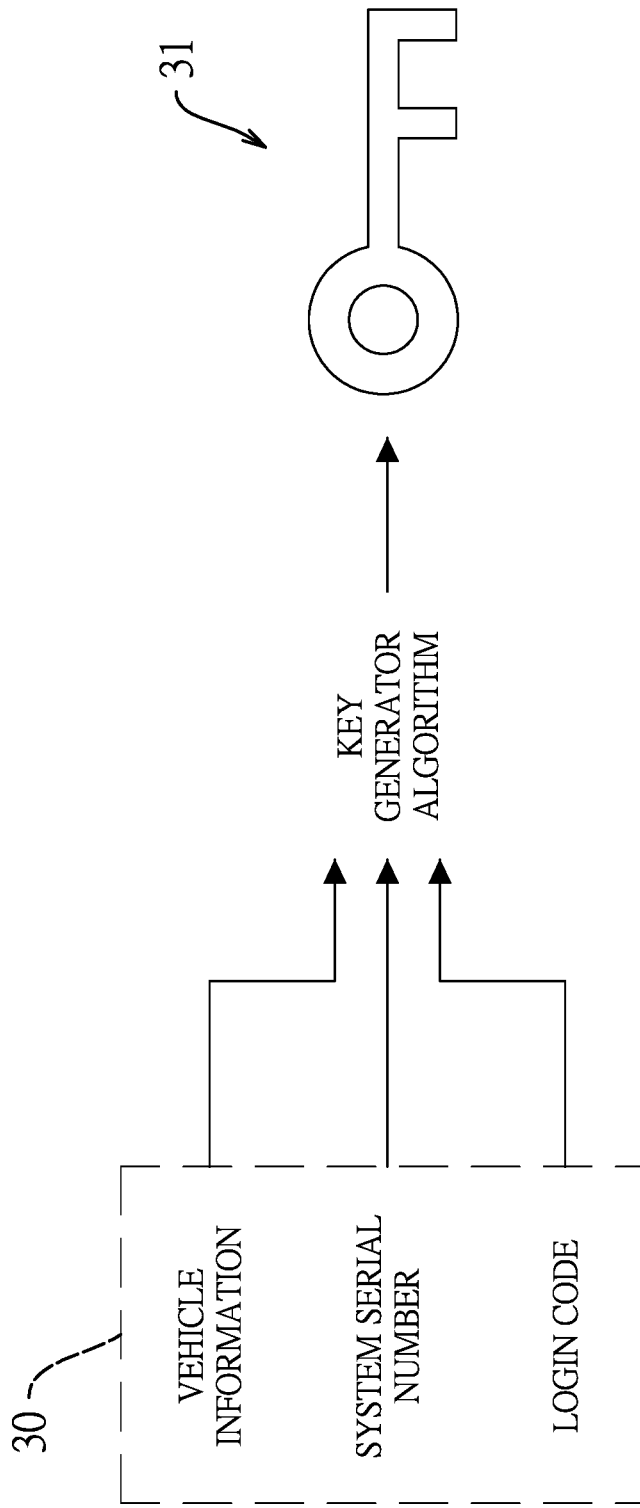
FIG. 3 is a flow chart of a vehicle-mounted processor generating a key according to host vehicle information through a key generator algorithm in the present invention.

With reference to FIG. 3, the vehicle-mounted processor 11 generates a key 31 according to at least one host vehicle information 30 of the autonomous vehicle through a key generator algorithm. The at least one host vehicle information 30 includes the vehicle information, the system serial number, and the login code previously mentioned. The key generator algorithm is conventional in a field of knowledge relating to the autonomous vehicle. For instance, a data format of the at least one host vehicle information 30 is a serial consisting of numbers, English alphabets, or codes. This means the vehicle information, the system serial number, and the login code of the at least one host vehicle information 30 are codes accessible by the vehicle-mounted processor 11. When the vehicle-mounted processor 11 executes the key generator algorithm, the vehicle-mounted processor 11 uses the serials of the at least one host vehicle information 30 as a basis to recode. For example, the vehicle-mounted processor 11 generates the key 31 by inserting random numbers to the serials of the at least one host vehicle information 30 previously mentioned.

The vehicle information of the at least one host vehicle information 30 can reflect real-time vehicle-related information. Since the autonomous vehicle and other vehicles nearly impossibly have the same real-time vehicle-related information simultaneously, and since the real-time vehicle-related information (including the vehicle coordinates, the speed, etc.) is time dependent, the real-time vehicle-related information is thus changing all the time. In other words, the vehicle information is unique at all times. Furthermore, since the system serial number and the login code are also unique, overall, the key 31 generated according to the at least one host vehicle information 30 would be unique as well. As such, the present invention prevents the key 31 to be directly copied.

Once the vehicle-mounted processor 11 has generated the key 31, the vehicle-mounted processor 11 stores the key 31 in a data packet. This way the key 31 is able to ensure that the data packet comes from the vehicle-mounted communication device 10 of the particular autonomous vehicle.

Figure 4:
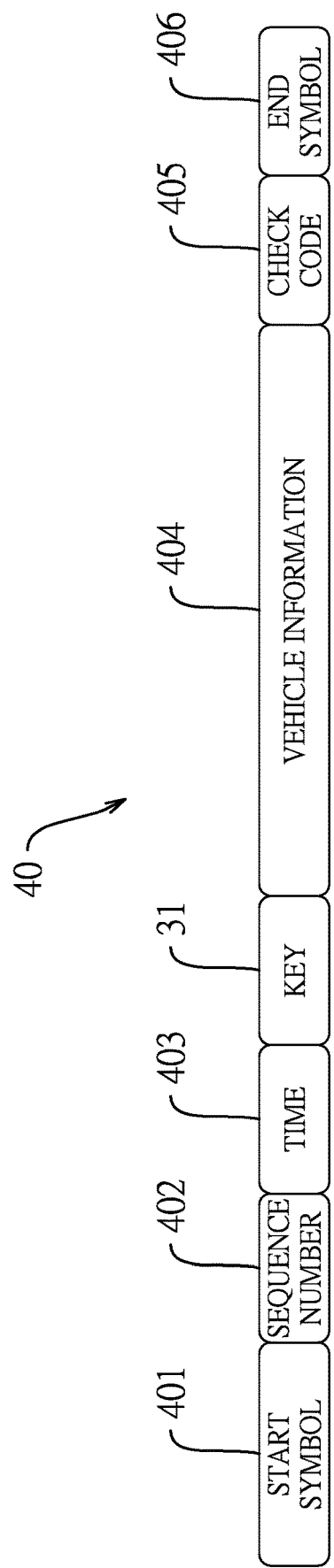
FIG. 4 is a perspective view of a data format of a data packet in the present invention.

With reference to FIG. 4, a message frame of the data packet 40, or a data format of the data packet 40, includes a start symbol 401, a sequence number 402, a time 403, the key 31, the vehicle information 404, a check code 405, and an end symbol 406. The start symbol 401 and the end symbol 406 define a completeness of the data packet 40. The sequence number 402 and the time 403 provide a chronological information of sending the data packet 40. In this embodiment, the check code 405 is a serial of Cyclic Redundancy Check (CRC), and in another embodiment, the check code 405 is a serial of Manchester. The key 31 may be stored in any position between the start symbol 401 and the end symbol 406 by default. When constructing an operating system for the present invention, the vehicle-mounted processor 11 and the terminal processor 21 should be set to process the same data format of the data packet 40. In other words, the vehicle-mounted processor 11 would store the key 31 in a particular position within the data packet 40, and the terminal processor 21 would be able to extract the key 31 from the particular position within the data packet 40. In the example of the data packet 40 illustrated in FIG. 4, the particular position of the key 31 is located between the time 403 and the vehicle information 404.

Figure 5:
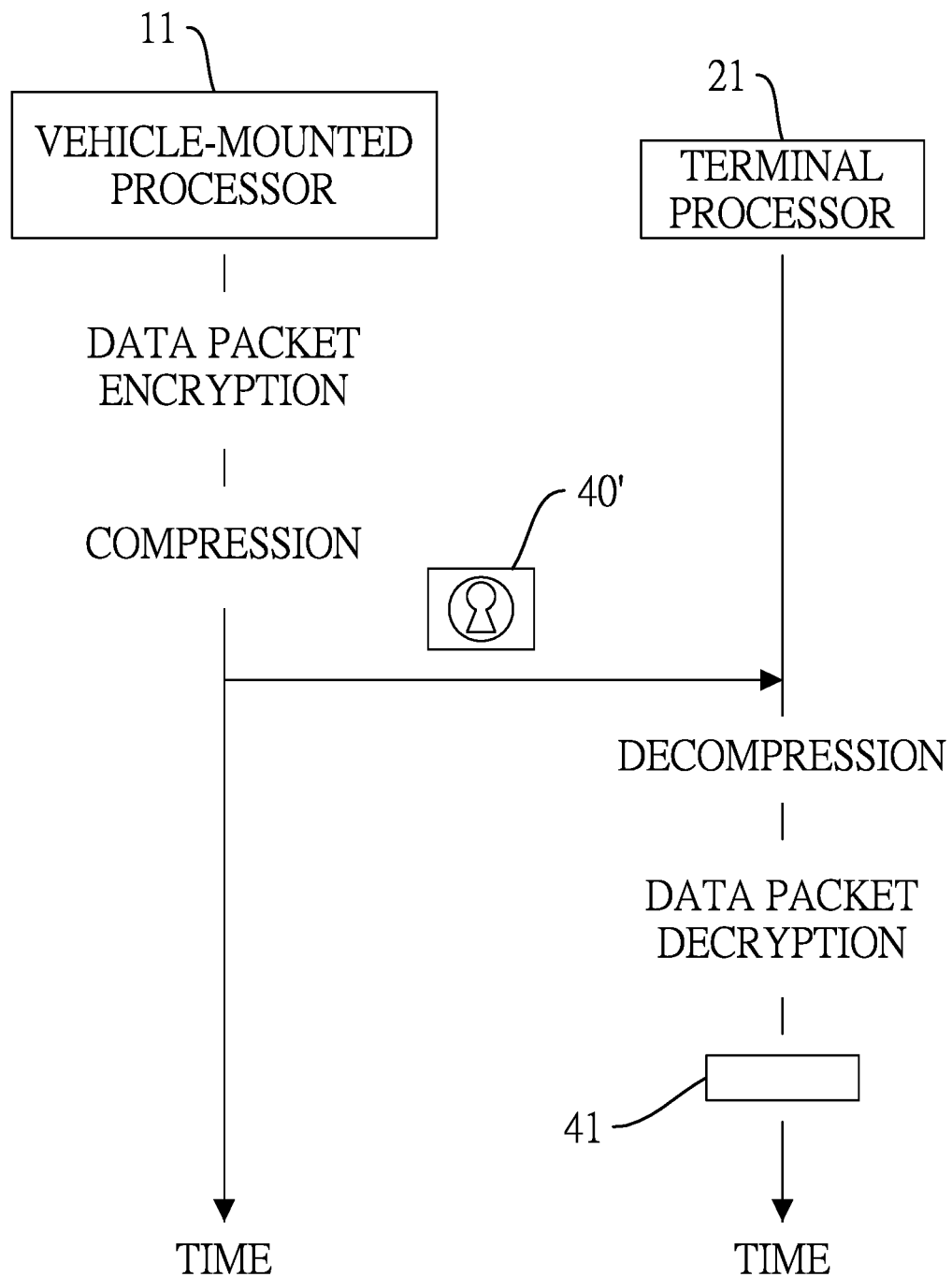
FIG. 5 is a flow chart of how the vehicle-mounted processor and a terminal processor process the data packet in an autonomous vehicle communication safety method of the present invention.

With further reference to FIG. 5, an autonomous vehicle communication safety method of the present invention is executed by the vehicle-mounted communication device 10 and the terminal communication device 20 as mentioned above. At least two communication channels CH are established between the vehicle-mounted communication device 10 and the terminal communication device 20. The autonomous vehicle communication safety method includes the following steps:

generating the key 31 according to the at least one host vehicle information of the autonomous vehicle by the at least one vehicle-mounted processor 11 of the vehicle-mounted communication device 10;

storing the key 31 within the data packet 40, encrypting and compressing the data packet 40, and outputting the data packet 40 which has been encrypted and compressed through the at least two communication channels CH by the at least one vehicle-mounted processor 11;

receiving at least two encrypted and compressed data packets 40' through the at least two communication channels CH by the at least one terminal processor 21 of the terminal communication device 20;

receiving at least two keys to be verified by decompressing and decrypting the at least two encrypted and compressed data packets 40' by the at least one terminal processor 21; and determining whether the at least two keys to be verified are identical, and then accordingly controlling connection statuses of the at least two communication channels CH by the at least one terminal processor 21.

More particularly, after the vehicle-mounted processor 11 generates the data packet 40, the vehicle-mounted processor 11 encrypts and compresses the data packet 40 to generate the data packet 40 which has been encrypted and compressed, in other words, the at least two encrypted and compressed data packets 40'. Through each of the vehicle-mounted communication interfaces 12 connected to the terminal communication device 20, the vehicle-mounted processor 11 respectively outputs the encrypted and compressed data packet 40'. In the embodiment described in FIG. 2, the vehicle-mounted processor 11 outputs the encrypted and compressed data packet 40' through the 5G communication channel CH1, the C-V2X communication channel CH2, and the Wi-Fi communication channel CH3 to the corresponding terminal communication interfaces 22 in the terminal communication device 20. The data packet 40 is encrypted and compressed using conventional means. For example, in an embodiment, the data packet 40 is encrypted with Symmetric-key algorithm, Advanced Encryption Standard (AES), or Stream cipher. The data packet 40 is compressed with Arithmetic Coding or Huffman Coding of Lossless compression. In other embodiments, the data packet 40 is encrypted and compressed using other conventional means.

With reference to FIG. 5, after the terminal processor 21 receives the encrypted and compressed data packet 40' through each of the terminal communication interfaces 22, the terminal processor 21 decompresses and decrypts the encrypted and compressed data packet 40' to obtain a pending packet 41. A content of the pending packet 41 would normally be equivalent to a content of the data packet 40. In other words, the terminal processor 21 decompresses and decrypts the encrypted and compressed data packet 40' in order to retrieve the data packet 40. When constructing an operating system for the present invention, the terminal processor 21 decompresses and decrypts the encrypted and compressed data packet 40' according to how the vehicle-mounted processor 11 encrypts and compresses the data packet 40 to be the encrypted and compressed data packet 40'. As such, the terminal processor 21 is able to retrieve the data packet 40 from the encrypted and compressed data packet 40'.

In an overview, the terminal processor 21 receives multiples of the encrypted and compressed data packets 40' respectively from multiples of the terminal communication interfaces 22. The terminal processor 21 then decompresses and decrypts multiples of the encrypted and compressed data packets 40' to obtain multiples of the pending packets 41. The terminal processor 21 then further reads data from the particular position of each of the pending packets 41 for obtaining a key to be verified. Therefore, the key to be verified corresponds to one of the communication channels CH.

The terminal processor 21 determines whether multiples of the keys to be verified received from the at least two communication channels CH are identical. Based on a result of the determination, the terminal processor 21 controls connection statuses of the at least two communication channels CH.

Figure 6:
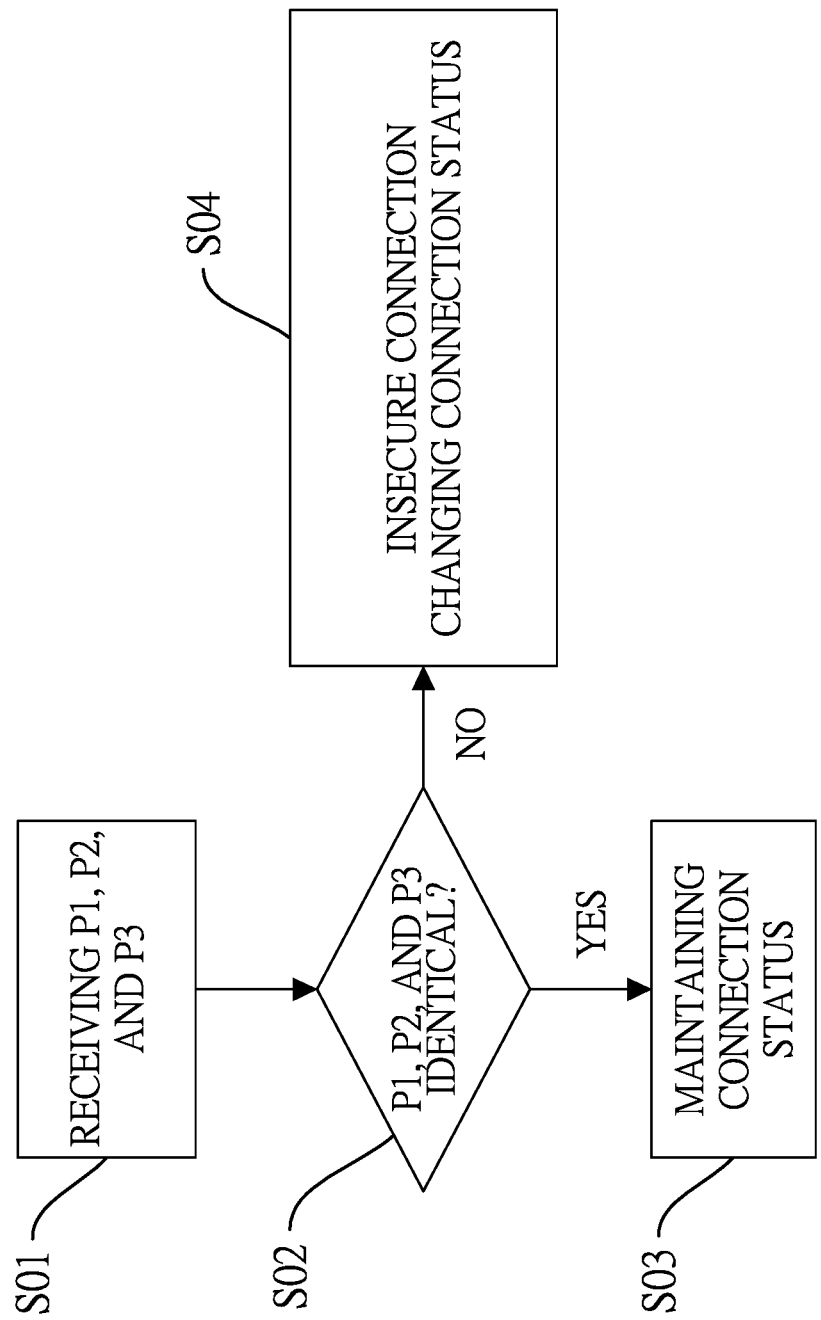
FIG. 6 is a flow chart of the terminal processor determining whether multiple keys to be verified are identical in the present invention.

With reference to FIG. 6 and with reference to the embodiment depicted in FIG. 2, the terminal processor 21 receives a first key to be verified P1, a second key to be verified P2, and a third key to be verified P3 (S01). The first key to be verified P1 comes from the encrypted and compressed data packet 40' received from the 5G communication channel CH1 (and the 5G mobile communication interface). The second key to be verified P2 comes from the encrypted and compressed data packet 40' received from the C-V2X communication channel CH2 (and the C-V2X communication interface). The third key to be verified P3 comes from the encrypted and compressed data packet 40' received from the Wi-Fi communication channel CH3 (and the Wi-Fi communication interface).

The terminal processor 21 then determines whether the first key to be verified P1, the second key to be verified P2, and the third key to be verified P3 are identical (S02). When the terminal processor 21 determines the first key to be verified P1, the second key to be verified P2, and the third key to be verified P3 are identical, the at least two communication channels CH between the vehicle-mounted communication device 10 and the terminal communication device 20 are considered secure by the terminal processor 21. As such, the terminal processor 21 maintains connection statuses of the at least two communication channels CH between the terminal communication interfaces 22 and the vehicle-mounted communication interfaces 12 unchanged (S03).

Vice versa, when the terminal processor 21 determines the first key to be verified P1, the second key to be verified P2, and the third key to be verified P3 are different, the terminal processor 21 considers that one of the encrypted and compressed data packets 40' sent from vehicle-mounted communication device to the terminal communication device 20 has been altered. This means that the at least two communication channels CH between the vehicle-mounted communication device 10 and the terminal communication device 20 are considered insecure by the terminal processor 21. As such, the terminal processor 21 changes the connection statuses of the at least two communication channels CH between the terminal communication interfaces 22 and the vehicle-mounted communication interfaces 12 (S04). For example, the terminal processor 21 may temporarily disconnect the connections between the terminal communication interfaces 22 and the vehicle-mounted communication interfaces 12, and only after a defaulted time has passed would the terminal processor 21 re-initiate handshaking and connection between the terminal communication interfaces 22 and the vehicle-mounted communication interfaces 12.

In the present invention, the vehicle-mounted processor 11 is free to output the encrypted and compressed data packets 40' elsewise than to the at least two communication channels CH. Similarly, the terminal processor 21 is free to receive, to decompress, to decrypt, and to verify the encrypted and compressed data packets 40' elsewise than from the at least two communication channels CH. As such, the present invention is able to decrease processing resources used for the vehicle-mounted processor 11 and the terminal processor 21, and thus increasing efficiency in verifying communication safety. Please refer to the following explanations.

As described previously, the at least two communication channels CH are established by connecting the terminal communication interfaces 22 respectively to the vehicle-mounted communication interfaces 12 as depicted in FIG. 1. The vehicle-mounted processor 11 sets one of the at least two communication channels CH as a main communication channel, and further sets rest of the at least two communication channels CH as backup communication channels. With reference to FIG. 2, the 5G communication channel CH1 is set to be the main communication channel as normally 5G mobile communication transfers data with the fastest speed. The C-V2X communication channel CH2 and the Wi-Fi communication channel CH3 are set to be the backup communication channels.

When the autonomous vehicle is running, the encrypted and compressed data packets 40' are only sent between the vehicle-mounted communication device 10 and the terminal communication device 20 through the main communication channel. In other words, the backup communication channels are idle without sending the encrypted and compressed data packets 40'.

Figure 7A:
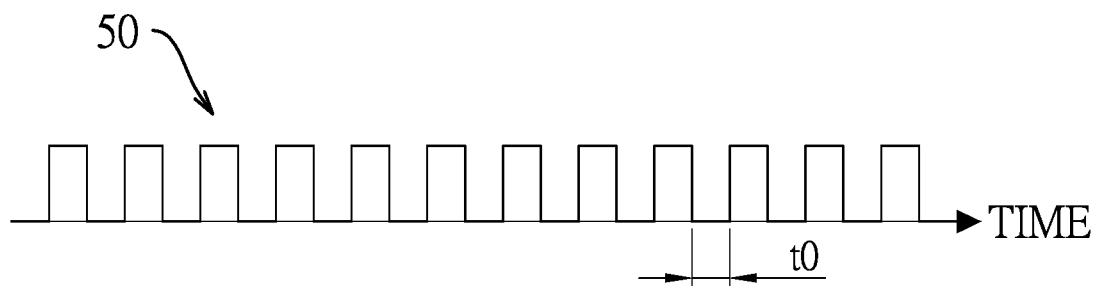
FIG. 7A is a perspective view of data transmitting status between a vehicle-mounted communication device and a terminal communication device through a main communication channel in the present invention.

With reference to FIG. 7A, a data transmitting status through the main communication channel is illustrated. More particularly, peaks 50 of a square wave illustrated in FIG. 7A represents the data transmitting status of the encrypted and compressed data packet 40' through the main communication channel. The peaks 50 are spaced with a time interval t0.

In an embodiment, the vehicle-mounted processor 11 outputs the encrypted and compressed data packets 40' simultaneously through the at least two communication channels CH at a random time. In other words, the vehicle-mounted processor 11 simultaneously outputs the encrypted and compressed data packets 40' through the main communication channel and each of the backup communication channels at the random time. The terminal processor 21 correspondingly receives multiples of the encrypted and compressed data packets 40' respectively through the at least two communication channels CH at the random time, and the terminal processor 21 then decompresses, decrypts, and verifies the encrypted and compressed data packets 40'.

Figure 7B:
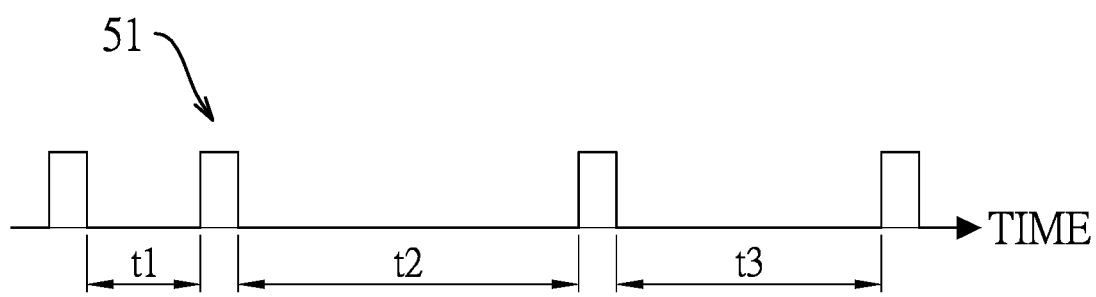
FIG. 7B is a perspective view of data transmitting status between the vehicle-mounted communication device and the terminal communication device through a backup communication channel in the present invention.

With reference to FIG. 7B, a data transmitting status through the backup communication channel is illustrated. More particularly, peaks 51 of a square wave illustrated in FIG. 7B represent the data transmitting status of the encrypted and compressed data packet 40' through each of the backup communication channels. The peaks 51 are spaced with randomized time intervals t1, t2, and t3. The randomized time intervals t1, t2, and t3 are each different, and each of the randomized time intervals t1, t2, and t3 is longer than the time interval t0 illustrated in FIG. 7A.

In another embodiment, the vehicle-mounted processor 11 outputs the encrypted and compressed data packets 40' simultaneously through the at least two communication channels CH at a default time. In other words, the vehicle-mounted processor 11 simultaneously outputs the encrypted and compressed data packets 40' through the main communication channel and each of the backup communication channels at the default time. The terminal processor 21 correspondingly receives multiples of the encrypted and compressed data packets 40' respectively through the at least two communication channels CH at the default time, and the terminal processor 21 then decompresses, decrypts, and verifies the encrypted and compressed data packets 40'.

Figure 7C:
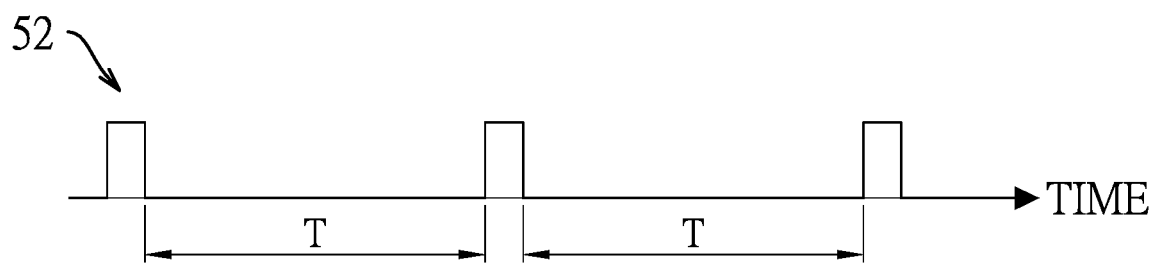
FIG. 7C is another perspective view of data transmitting status between the vehicle-mounted communication device and the terminal communication device through the backup communication channel in the present invention.

With reference to FIG. 7C, peaks 52 of a square wave illustrated in FIG. 7C represents the data transmitting status of the encrypted and compressed data packet 40' through each of the backup communication channels. The peaks 52 are spaced with the default time T, and the default time T is longer than the time interval t0 illustrated in FIG. 7A.

Since the randomized time intervals t1, t2, and t3 illustrated in FIG. 7B and the default time T illustrated in FIG. 7C are all longer than the time interval t0 illustrated in FIG. 7A, the vehicle-mounted processor 11 intermittently outputs the encrypted and compressed data packets 40' simultaneously through the at least two communication channels CH. The terminal processor 21 also intermittently receives the encrypted and compressed data packets 40' simultaneously through the at least two communication channels CH, and the terminal processor 21 then decompresses, decrypts, and verifies the encrypted and compressed data packets 40'. The way, processing resources are efficiently used for transporting the encrypted and compressed data packets 40' between the vehicle-mounted processor 11 and the terminal processor 21, and thus increasing efficiency in verifying communication safety for the present invention.

In conclusion, to ensure communication is secure between the autonomous vehicle and the terminal, the vehicle-mounted processor 11 of the present invention generates the key 31. The key 31 is unique, and the key 31 is stored in the data packet 40. According to a collaboration between the vehicle-mounted communication device 10 and the terminal communication device 20 (as previously mentioned), when the terminal processor 21 determines the at least two keys to be verified are different, the terminal processor 21 determines that the at least two communication channels CH between the vehicle-mounted communication device 10 and the terminal communication device 20 are insecure and prone to be compromised by hackers. As such, the present invention would immediately change the connection statuses of the at least two communication channels CH, and thus avoid further communicating under insecure channels and ensure communication safety for the vehicle-mounted communication device 10 and the terminal communication device 20.

Furthermore, the check code 405 from the data packet 40, and the encryption and compression from the vehicle-mounted processor 11 towards the data packet all serve as means for protecting data transferred between the at least two communication channels CH. The terminal processor 21 is able to determine whether content of the data packet 40 has been altered by determining whether the check code 405 is correct. If the check code 405 is wrong, the terminal processor 21 immediately determines that the data packet 40 is abnormal and prone to be compromised, and thus the terminal processor 21 would control the connection statuses of the at least two communication channels CH. Furthermore, after the data packet 40 is compressed and encrypted, not only transportation for transporting the encrypted and compressed data packets 40' costs less, but also the data packet 40 is more secured to be transported as the encrypted and compressed data packets 40'. Overall, the present invention compresses and encrypts the data packet 40 to be the encrypted and compressed data packets 40' as a kind of compound encryption method, and as such, the present invention is able to enhance protection strength towards the data packet 40, securing the data packet's data integrity.

What is claimed is:

1. An autonomous vehicle communication safety system, comprising:
    a vehicle-mounted communication device, mounted on an autonomous vehicle, and having at least one vehicle-mounted processor and multiple vehicle-mounted communication interfaces; wherein the vehicle-mounted communication interfaces are electrically connected to the at least one vehicle-mounted processor; wherein the at least one vehicle-mounted processor generates a key according to at least one host vehicle information of the autonomous vehicle, and the at least one vehicle-mounted processor stores the key within a data packet; and
    a terminal communication device, mounted away from the vehicle-mounted communication device, and having at least one terminal processor and multiple terminal communication interfaces; wherein the terminal communication interfaces are electrically connected to the at least one terminal processor; wherein at least two communication channels are established between at least two of the terminal communication interfaces and at least two of the vehicle-mounted communication interfaces;
    wherein the at least one vehicle-mounted processor encrypts and compresses the data packet and outputs the data packet which has been encrypted and compressed through the at least two communication channels; the at least one terminal processor receives at least two encrypted and compressed data packets through the at least two communication channels, and after decompressing and decrypting the at least two encrypted and compressed data packets, the at least one terminal processor receives at least two keys to be verified; the at least one terminal processor determines whether the at least two keys to be verified are identical, and then accordingly controls connection statuses of the at least two communication channels.

2. The autonomous vehicle communication safety system as claimed in claim 1, wherein:
    the at least one vehicle-mounted processor outputs the at least two encrypted and compressed data packets through the at least two communication channels at a random time; and
    the at least one terminal processor correspondingly receives the at least two encrypted and compressed data packets respectively through the at least two communication channels.

3. The autonomous vehicle communication safety system as claimed in claim 1, wherein:
    the at least one vehicle-mounted processor outputs the at least two encrypted and compressed data packets through the at least two communication channels at a default time; and
    the at least one terminal processor correspondingly receives the at least two encrypted and compressed data packets respectively through the at least two communication channels.

4. The autonomous vehicle communication safety system as claimed in claim 1, wherein:
    the at least one host vehicle information comprises a vehicle information, a system serial number, and a login code.

5. The autonomous vehicle communication safety system as claimed in claim 4, wherein:
    a data format of the data packet comprises a start symbol, a sequence number, a time, the key, the vehicle information, a check code, and an end symbol.

6. The autonomous vehicle communication safety system as claimed in claim 4, wherein:
    the at least one vehicle-mounted processor receives the system serial number and the login code from an autonomous operating system of the autonomous vehicle; the login code represents a user identity conveyed and stored by a digital key or a digital controller for the autonomous vehicle;
    the vehicle information comprises at least one of the following: an identification, a vehicle identification number, a system time of the autonomous operating system of the autonomous vehicle, vehicle coordinates, acceleration information, live camera feed, traffic information, and speed.

7. The autonomous vehicle communication safety system as claimed in claim 5, wherein:
    the key is stored in any position between the start symbol and the end symbol.

8. The autonomous vehicle communication safety system as claimed in claim 1, wherein:
    the terminal communication device is mounted on a terminal, and the terminal is a road side unit, a back-end information station, or another autonomous vehicle.

9. The autonomous vehicle communication safety system as claimed in claim 1, wherein:
    the multiple vehicle-mounted communication interfaces and the multiple terminal communication interfaces each comprise two of the following: a $5^{th}$ generation mobile communication interface, a $4^{th}$ generation mobile communication interface, a Cellular Vehicle-to-Everything communication interface, a Wi-Fi communication interface, a Bluetooth Low Energy communication interface, and a next generation communication interface.

10. The autonomous vehicle communication safety system as claimed in claim 1, wherein:
    the at least one host vehicle information is at least one code accessible by the at least one vehicle-mounted processor.

11. An autonomous vehicle communication safety method, executed by a vehicle-mounted communication device and a terminal communication device, wherein at least two communication channels are established between the vehicle-mounted communication device and the terminal communication device;
    the autonomous vehicle communication safety method comprises the following steps:
    generating a key according to at least one host vehicle information of the autonomous vehicle by at least one vehicle-mounted processor of the vehicle-mounted communication device;
    storing the key within a data packet, encrypting and compressing the data packet, and outputting the data packet which has been encrypted and compressed through the at least two communication channels by the at least one vehicle-mounted processor;

receiving at least two encrypted and compressed data packets through the at least two communication channels by at least one terminal processor of the terminal communication device;

receiving at least two keys to be verified by decompressing and decrypting the at least two encrypted and compressed data packets by the at least one terminal processor; and determining whether the at least two keys to be verified are identical, and then accordingly controlling connection statuses of the at least two communication channels by the at least one terminal processor.

12. The autonomous vehicle communication safety method as claimed in claim 11, wherein:

the vehicle-mounted processor outputs the at least two encrypted and compressed data packets through the at least two communication channels at a random time; and the terminal processor correspondingly receives the at least two encrypted and compressed data packets respectively through the at least two communication channels.

13. The autonomous vehicle communication safety method as claimed in claim 11, wherein:

the vehicle-mounted processor outputs the at least two encrypted and compressed data packets through the at least two communication channels at a default time; and the terminal processor correspondingly receives the at least two encrypted and compressed data packets respectively through the at least two communication channels.

14. The autonomous vehicle communication safety method as claimed in claim 11, wherein:

the at least one host vehicle information comprises a vehicle information, a system serial number, and a login code.

15. The autonomous vehicle communication safety method as claimed in claim 14, wherein:

a data format of the data packet comprises a start symbol, a sequence number, time, the key, the vehicle information, a check code, and an end symbol.

16. The autonomous vehicle communication safety method as claimed in claim 14, wherein:

the at least one vehicle-mounted processor receives the system serial number and the login code from an autonomous operating system of the autonomous vehicle; the login code represents a user identity conveyed and stored by a digital key or a digital controller for the autonomous vehicle;

the vehicle information comprises at least one of the following: an identification, a vehicle identification number, a system time of the autonomous operating system of the autonomous vehicle, vehicle coordinates, acceleration information, live camera feed, traffic information, and speed.

17. The autonomous vehicle communication safety method as claimed in claim 15, wherein:

the key is stored in any position between the start symbol and the end symbol.

18. The autonomous vehicle communication safety method as claimed in claim 11, wherein:

the terminal communication device is mounted on a terminal, and the terminal is a road side unit, a back-end information station, or another autonomous vehicle.

19. The autonomous vehicle communication safety method as claimed in claim 11, wherein:

the multiple vehicle-mounted communication interfaces and the multiple terminal communication interfaces each comprise two of the following: a $5^{th}$ generation mobile communication interface, a $4^{th}$ generation mobile communication interface, a Cellular Vehicle-to-Everything communication interface, a Wi-Fi communication interface, a Bluetooth Low Energy communication interface, and a next generation communication interface.

20. The autonomous vehicle communication safety method as claimed in claim 11, wherein:

the at least one host vehicle information is at least one code accessible by the at least one vehicle-mounted processor.

* * * * *